Jan. 5, 1954 M. V. TRACY 2,664,924
ADJUSTABLE TOOL SUPPORTING STAND
Filed July 3, 1950 3 Sheets-Sheet 1

INVENTOR
Mearl V. Tracy
BY
ATTORNEYS

Jan. 5, 1954 M. V. TRACY 2,664,924
ADJUSTABLE TOOL SUPPORTING STAND
Filed July 3, 1950 3 Sheets-Sheet 2

INVENTOR
Mearl V. Tracy
BY
ATTORNEYS

Jan. 5, 1954     M. V. TRACY     2,664,924
ADJUSTABLE TOOL SUPPORTING STAND
Filed July 3, 1950     3 Sheets-Sheet 3
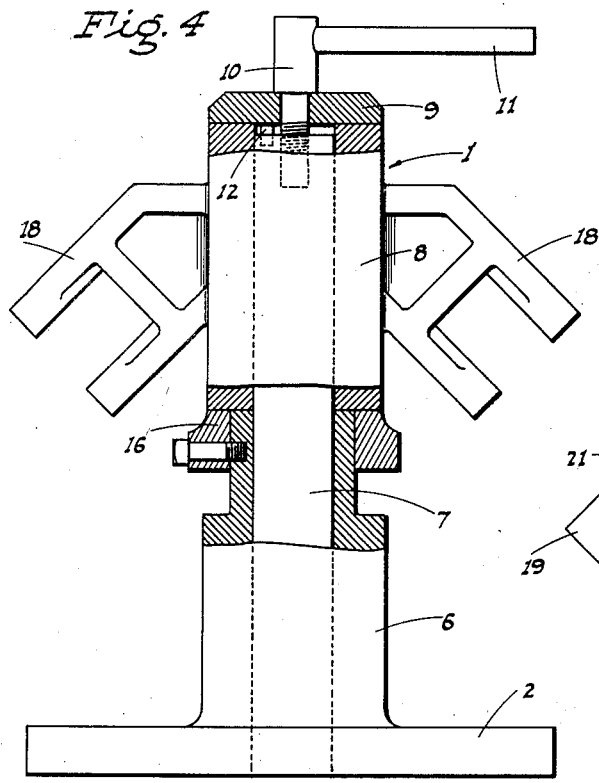
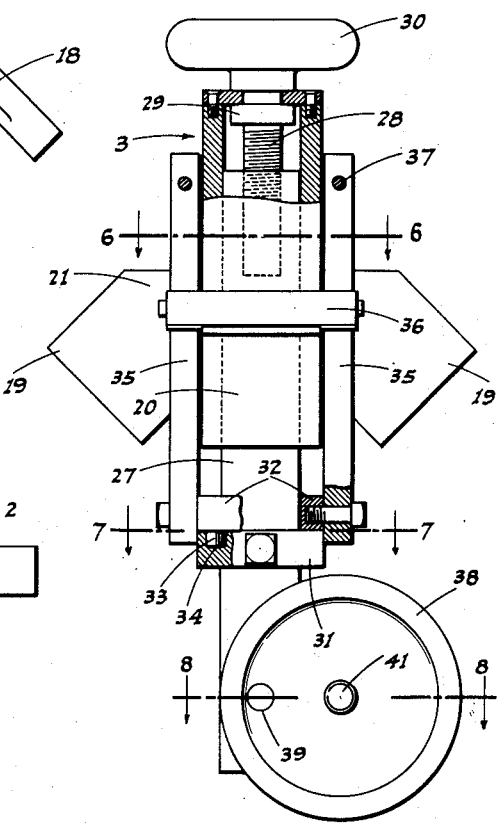
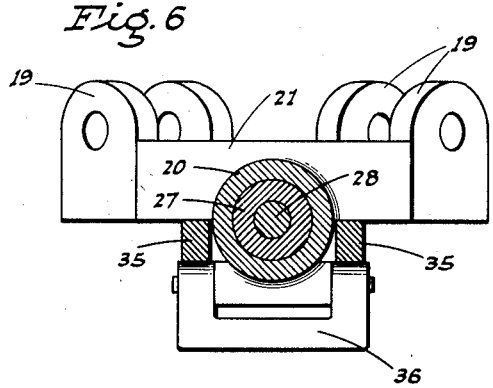
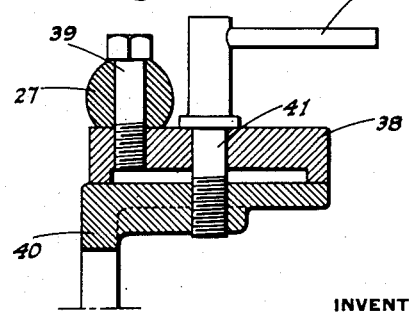
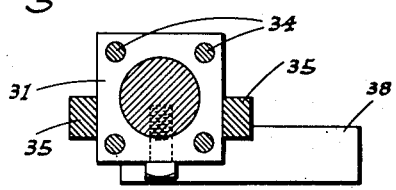
INVENTOR
Mearl V. Tracy
BY *Webster & Webster*
ATTORNEYS Patented Jan. 5, 1954

2,664,924

UNITED STATES PATENT OFFICE 2,664,924

ADJUSTABLE TOOL SUPPORTING STAND

Mearl V. Tracy, Pasadena, Calif.

Application July 3, 1950, Serial No. 171,859

3 Claims. (Cl. 143—36)

This invention provides, as a major object, a novel device whereby an initially portable or hand tool—such as an electric hand saw—may be mechanically supported, as from a stand or bench, for ready and convenient use.

When used with an electric hand saw (as shown herein), the combination provides a very effective radial-type saw unit adaptable to many different cutting operations; the saw being adjustably mounted on the support.

Another object of the invention is to provide a tool support on which an initially portable power hand tool may be mounted for straight line travel to and fro in a horizontal plane and above the work stand or bench on which the device is secured.

A further object of the invention is to provide a tool support which includes a novel toggle arm assembly operative to produce the aforesaid straight line motion of the supported tool upon advance or retraction of the same manually; such toggle arm assembly being arranged so that the support is very compact front to rear, i. e. with minimum forward projection, when the tool is in retracted position.

An additional object of the invention is to provide a tool support, for the purpose described, which is simple in design—being readily and economically manufactured; sturdy in construction; and with the parts well balanced and journaled for easy manual shifting of the tool back and forth without mechanical aids.

It is also an object of the invention to provide the device with mechanism whereby the supported tool can be adjusted, manually, with respect to its working position; the adjustment being accomplished in a facile and expeditious manner.

Still another object of the invention is to provide a practical and reliable tool support, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged front elevation, part in section, of the rear post unit, detached.

Fig. 5 is an enlarged front elevation, part in section, of the front post unit, detached.

Fig. 6 is a transverse section on line 6—6 of Fig. 5.

Fig. 7 is a transverse section on line 7—7 of Fig. 5.

Fig. 8 is a transverse section on line 8—8 of Fig. 5.

Figure 1:
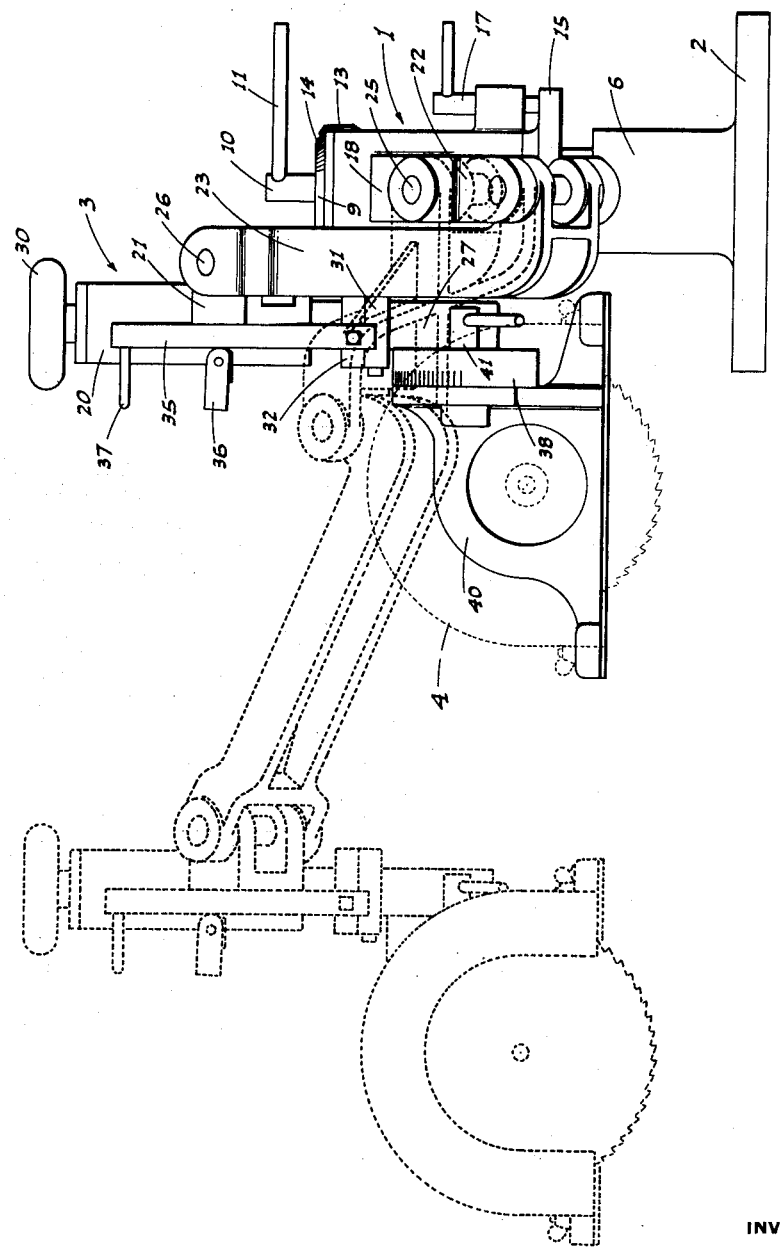
Fig. 1 is a side elevation of the tool support having an electric hand saw mounted thereon; the support being shown in retracted position in full lines, and in advanced position in dotted lines.
Figure 2:
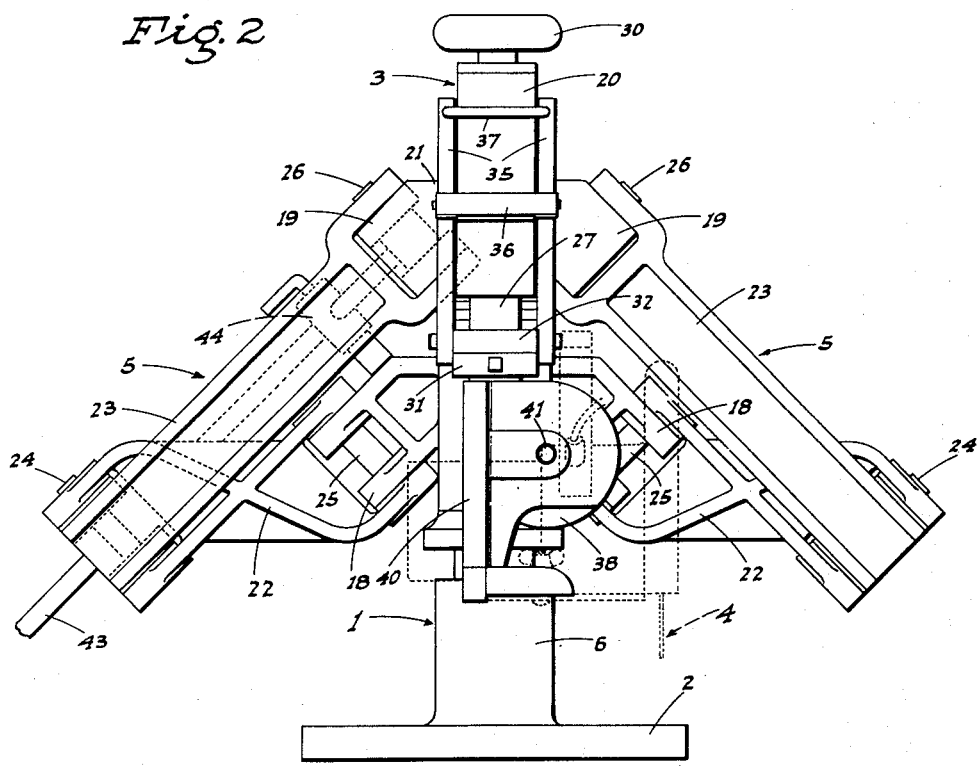
Fig. 2 is a front elevation of the tool support, retracted.

Referring now more particularly to the characters of reference on the drawings, the novel tool support comprises a rear post unit, indicated generally at 1, upstanding from a base 2, and a front post unit, indicated generally at 3, fitted at its lower end with a tool, here an electric hand saw 4. The base 2 is adapted to be secured to a work bench or stand.

The front post unit 3 is mounted in connection with the rear post unit 1 for straight-line to and fro motion in a horizontal plane by means of a pair of transversely spaced toggle arm assemblies, each of which is indicated at 5; such arm assemblies buckling laterally outwardly, normally canting downwardly from the opposite ends toward the elbows, and being constructed in the manner which will hereinafter appear.

The rear post unit 1 comprises a pedestal 6 which upstands from the base 2, such pedestal being tubular, and a cylindrical post 7 is secured in the tubular pedestal 6 and projects a substantial distance thereabove.

A mounting sleeve 8 is rotatably disposed on the post 7 above the pedestal 6, and is supported by the latter; such mounting sleeve 8 normally being held against rotation by a clamping cap 9 on said sleeve, and a clamping screw 10 which extends through the cap 9 and is threaded into the upper end of the post 7.

The clamping screw 10 includes a hand lever arm 11 to facilitate rotation of such screw, and the clamping cap 9 includes a locating pin 12 (Fig. 4) which seats in a matching socket in the upper end of the post 7 to prevent such cap from rotating. Rotative positions of adjustment of the sleeve 8 are indicated by a pointer 13 on said sleeve which reads on a peripheral scale 14 on the cap. Additionally, to quickly locate the mounting sleeve 8 in a central position, or turned 45° to right or left, an index plate 15 projects rearwardly from a collar 16 fixed on the post, and an index pin 17 fixed in connection with the mounting sleeve 8 cooperates with said index plate.

The pair of outwardly buckling toggle arm assemblies 5 are constructed and mounted as follows:

The mounting sleeve 8 is formed on opposite sides with outwardly projecting pivot brackets 18, while similar and corresponding pivot brackets 19 are disposed on opposite sides of an upstanding mounting sleeve 20 which is included in the front post unit 3; the pivot brackets 19 being connected together, and to said mounting sleeve 20, by a cross bar 21.

Each toggle arm assembly 5 comprises a rear arm 22 and a front arm 23, hinged together at the elbow by a pivot pin 24. The outer end of each rear arm 22 is hinged to the corresponding bracket 18 by a pivot pin 25, and the outer end of each front arm 23 is hinged to the corresponding bracket 19 by a pivot pin 26.

As previously described, each arm assembly 5, when retracted, is canted downwardly from opposite ends toward the elbows; the brackets 18 and 19 being formed and bored so that the pivot pins 25 and 26 are disposed at an upward and outward incline—with respect to the vertical axis of the rear post unit 1 and front post unit 3—of 45°. The elbow pivot pin 24 of each toggle arm assembly 5 is correspondingly inclined, whereby all the pivots of each such arm assembly are parallel.

With this arrangement, the front post unit 3 is mounted for free or unrestricted to and fro motion, in a horizontal plane, relative to the rear post unit 1, but lateral swinging or side thrusting of said front post unit is prevented. In other words, the upward and outward inclining of all pivots of each arm assembly at 45° effectively prevents any side play of the front post unit.

The front post unit 3 includes, in addition to the mounting sleeve 20, a cylindrical post 27 vertically adjustably disposed in said sleeve 20; the post 27 being adjustable up or down by means of an adjustment screw 28 (Fig. 5) threaded into the upper end portion of said post, rotatably but axially immovably mounted in connection with the sleeve 20, as at 29, and fitted, at its upper end, with a hand wheel 30.

By manipulating the hand wheel 30 the cylindrical post 27, whose lower end portion projects a considerable distance below the mounting sleeve 20, may be raised or lowered selectively.

The cylindrical post 27 is secured for selective rotative positioning as follows:

An adjustment or index plate 31 is fixed on and surrounds the post 27 at the lower end of the sleeve 20, and an index collar 32 surrounds the sleeve directly above the index plate 31, said collar 32 having an index pin 33 which projects downwardly for selective engagement in one of a plurality of sockets 34 in the index plate 31, said sockets being 90° apart.

Vertical side bars 35 are secured at their lower ends to opposite sides of the index collar 32, and extend upwardly along the mounting sleeve 20, being engaged—intermediate their ends—between the cross bar 21 and a vertically swingable cam type clamping yoke 36 accessible from ahead of the mounting sleeve 20 for manual operation.

Normally, the yoke 36 clampingly engages the vertical side bars 35 against the cross bar 21, with the index collar 32 in a position with the index pin 33 in one of the sockets 34. To effect a rotative adjustment of the cylindrical post 27 (from which the tool is supported, as will hereinafter appear), the clamping yoke 36 is released and the index collar 32 raised until the pin 33 clears the socketed index plate 31. The desired adjustment is then made, and the index pin 33 re-engaged in one of the sockets 34 by lowering the collar 32, and then the side bars 35 are again clamped up by the yoke 36.

Raising of the vertical side bars 35 and index collar 32 to accomplish the above adjustment is facilitated by a hand bail 37 which connects the side bars 35 at their upper ends, with said bail spanning about the front portion of the mounting sleeve 20.

The tool, as for example the electric hand saw 4, is mounted in connection with the lower end portion of the post 27 as follows:

A vertically disposed attachment disc 38 is secured, in offset relation, by a bolt 39 to the post 27, and an adapter 40 is rotatably adjustably fixed against the attachment disc 38 by a clamping screw 41, which clamping screw has a hand lever arm 42 to facilitate its manipulation.

The adapter 40 is formed to matchingly engage attachment parts of the hand tool, such as the electric hand saw 4, and varied adapters are used for different tools.

With a tool support as described, an electric hand saw 4 or the like may be mounted for use as a radial type saw, with the saw movable—by hand—easily and in a well-balanced manner to and fro in a straight-line, horizontal path with respect to the rear post unit 1, yet without lateral swaying or side thrusting.

Additionally, the several adjustable parts of the saw support make possible the setting and use of the tool in different angular positions. When a saw is used the angle of cut is controlled by the adjustment of the mounting sleeve 8 in the rear post unit 1; the depth of cut is controlled by vertical adjustment of the mounting sleeve 20; and the angle of the saw with respect to the post 27 is adjusted through the medium of the attachment disc 38 and adapter 40. Additionally, the cylindrical post 27 is adjustable about its vertical axis in the manner described.

The saw 4 is so disposed on adapter 40 relative to the pivot 41 of said adapter that the saw may be swung from a 90 degree to a 45 degree setting relative to the work (the positions most commonly used) without affecting the level of the cutting edge of the saw relative to the work. It is, therefore, unnecessary to raise or lower post 27, and considerable set-up time is saved.

Under certain conditions it may be desired to work the supported tool with the arm assemblies 5 in a locked-up position, and this is accomplished by means of a holding rod 43 having pivotal connection with the outer end of one of the front arms 23 and sliding through a locking device 44 pivotally mounted in connection with the outer end of the corresponding rear arm 22.

Figure 3:
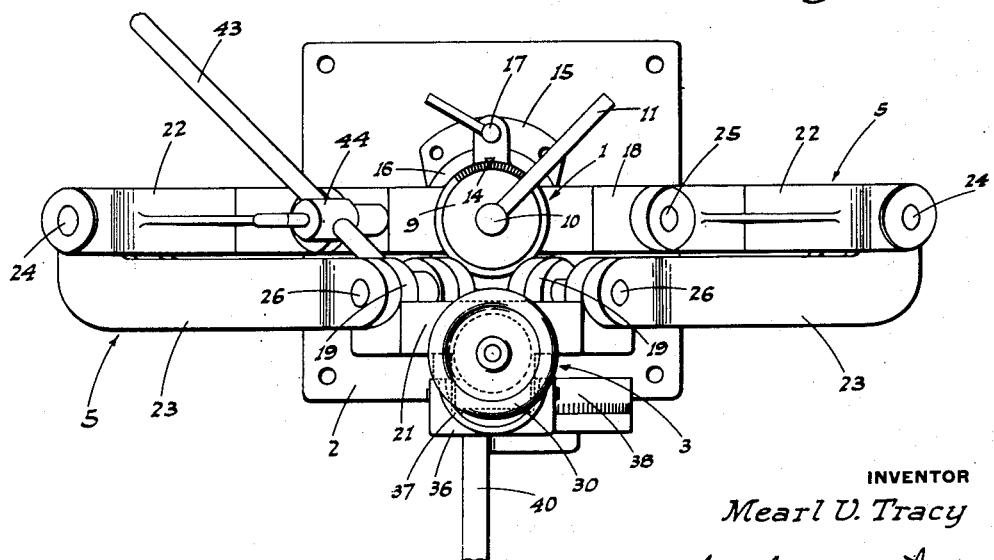
Fig. 3 is a top plan of the tool support, retracted.

The tool support, in addition to its easy and convenient operation, as hereinafter described, has the further advantage of being very compact, and when the arm assemblies are in their retracted position, as in Fig. 3, the support occupies a minimum of space from front to rear; the rear and front arms 22 and 23, respectively, of each arm assembly then lying in parallel side by side engagement. This parallelism is possible by reason of the fact that the front arms 23 are formed, at the elbow, with an offset which projects through the hinge.

It will be noted that due to the particular mounting and weight distribution of the arms 22 and 23 relative to each other and to post units 1 and 3, post unit 3, on which the saw is mounted, will retract of itself toward post unit 1 when the advancing pull on unit 3 is released, and there will be no rebound from the fully retracted position. This safety feature, as usually required by law, is, therefore, inherent in this device without the use of added springs, weights, etc.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An adjustable tool support comprising a rear upstanding and relatively fixed post unit, a movable front post unit, a toggle arm assembly connecting the units, the front post unit including a vertical sleeve on which the adjacent end of the toggle arm assembly is hinged and a post turnable and adjustably slidable in the sleeve and projecting therebelow; means to attach a tool to the post below the sleeve, and means between the post and sleeve to releasably maintain the post in different positions of rotated adjustment relative to the sleeve, said last named means comprising an index plate on the post below the sleeve, a cooperating index collar slidable on the sleeve, a bar upstanding from the collar along the sleeve, a backstop on the sleeve rearwardly of the bar, and a manually releasable holding cam mounted on the sleeve and bearing against the front of the bar, an index plate on the post below the sleeve, a cooperating index collar slidable on the sleeve, a bar upstanding from the collar along the sleeve, a backstop on the sleeve rearwardly of the bar, and a manually releasable holding cam mounted on the sleeve and bearing against the front of the bar.

2. An adjustable tool support comprising a rear upstanding and relatively fixed post unit, a movable front post unit, a toggle arm assembly connecting the units, the front post unit including a vertical sleeve on which the adjacent end of the toggle arm assembly is hinged and a post turnable and adjustably slidable in the sleeve and projecting therebelow; means to attach a tool to the post below the sleeve, an index plate on the post below the sleeve, a cooperating index collar slidable on the sleeve, bars upstanding from opposite sides of the collar and extending along the sleeve, a back-stop on the sleeve rearwardly of each bar, and a cam type clamping yoke pivoted on the sleeve at the front and normally but releasably clamping the bars against the adjacent back stop.

3. A tool support, as in claim 2, including a hand bail extending between and projecting forwardly from said bars.

MEARL V. TRACY.

References Cited in the file of this patent

UNITED STATES PATENTS

| Number | Name | Date |
|---|---|---|
| 984,679 | Lancaster | Feb. 21, 1911 |
| 1,707,764 | Mattison | Apr. 2, 1929 |
| 1,748,446 | Gatzsch | Feb. 25, 1930 |
| 1,756,121 | Hedgpeth | Apr. 29, 1930 |
| 2,007,563 | De Koning | July 9, 1935 |
| 2,258,828 | Trebert | Oct. 14, 1941 |
| 2,382,971 | Brocco et al. | Aug. 21, 1945 |
| 2,389,296 | Crane | Nov. 20, 1945 |

FOREIGN PATENTS

| Number | Country | Date |
|---|---|---|
| 581,369 | Germany | July 26, 1933 |
| 243,405 | Switzerland | Dec. 16, 1946 |